Feb. 18, 1930.  F. S. CARR  1,748,047
SEPARABLE FASTENER
Filed Dec. 30, 1926
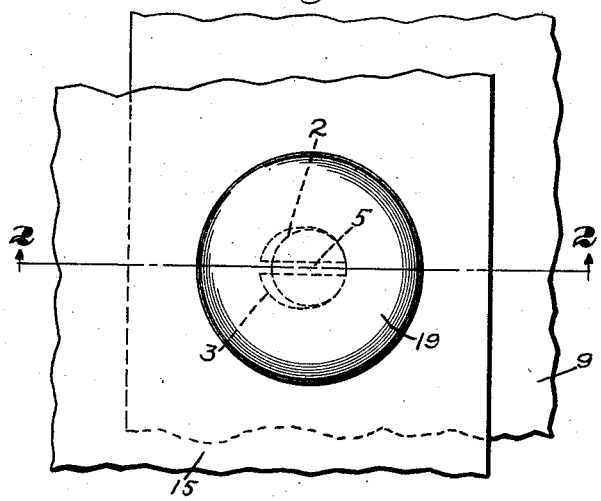
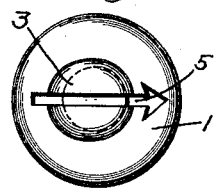
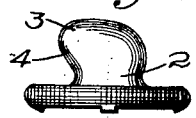
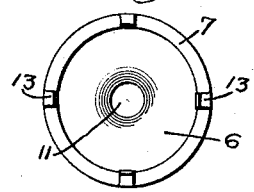
Inventor:
Fred S. Carr
by Emery Booth Janney + Varney
Atty's Patented Feb. 18, 1930

1,748,047

UNITED STATES PATENT OFFICE

FRED S. CARR, OF NEWTON, MASSACHUSETTS, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

SEPARABLE FASTENER

Application filed December 30, 1926. Serial No. 157,967.

My invention aims to provide improvements in separable fasteners of the three-side lock type.

Reference is hereby made to my co-pending application, Serial No. 81,863, filed January 16, 1926, which contains claims generic to the particular type of stud member shown in this application.

In the drawings, which illustrate a preferred embodiment of my invention:—

Figure 1 is an elevation of the complete fastener installation;

Fig. 2 is a section on the line 2—2 of Fig. 1;

Fig. 3 is a plan view of the stud member;

Fig. 4 is a side elevation of the stud member;

Fig. 5 is an underside view of the stud member; and

Fig. 6 is a side elevation of the socket member of the fastener before attachment to its support.

Referring to the embodiment of my invention illustrated by the drawings, I have shown a three-side lock fastener particularly, though not exclusively, useful for securing together the overlapping portions at the wrist portion of a glove or the like.

The stud member is pressed from sheet metal and has a base 1, a neck 2, and a head 3. The head is offset with relation to the neck, to provide a shoulder 4 which is more pronounced at one side of the stud (that side away from the edge when mounted). This shoulder gradually diminishes toward the sides so that, at the side opposite the pronounced portion (Fig. 2), there is little or no shoulder and the fastener may be easily separated by a pull exerted at this side.

A single slit 5 divides the head 3 and neck into opposed resilient portions, and the ends of the slit terminate in the base as shown in Fig. 3. One end of the slit 5 (that adjacent the substantially shoulderless side of the stud) is enlarged to provide for increased yielding of the contractible and expansible portions of the stud adjacent the shoulderless part, over the resiliency of the shouldered part, by permitting the base portion of the stud to yield more freely at this point.

An attaching part 6 is secured to the stud by rolling the edge 7 of the base 1 of the stud over the outer peripheral portion thereof. The center of this part 6 is pressed out to form an anvil portion 8 and this extends up into the hollow of the stud in the manner shown in Fig. 2.

The stud is attached to its carrying medium 9 by means of a second attaching part 10 located at the opposite side of the carrying medium. A rivet portion 11 of the part 10 passes through a hole 12 in the carrying medium and, when the parts are pressed together, is upset and clenched by the anvil portion 8, as clearly indicated by Fig. 2. Gripping spurs 13 are provided on the inturned edge 7 of the base 1 of the stud, and these press the carrying medium 9 tightly against the part 10, so that stress exerted upon the carrying medium will not pull it loose.

The socket 14 is pressed from a single piece of metal (Fig. 6) and has a base which lies against one face of a carrying medium 15, when secured thereto as shown in Fig. 2. The central portion of the socket is pressed out to provide a stud-receiving aperture 16, surrounded by a wall which is formed into a neck-engaging portion 17 and a rivet portion 18. The wall passes through a hole in the carrying medium 15 and the free end of the rivet portion 18, which is split (Fig. 6) is upset and clenched by an attaching plate. This attaching plate comprises a cover plate 19, an anvil plate 20 and a clench plate 21 assembled as shown in Fig. 2.

When the stud and socket are secured together, as shown in Fig. 2, the offset portion or head 3 engages with the rivet portion 18, of the wall, and, directly opposite the neck-engaging portion 17 of the wall, closely embraces the neck 2 of the stud so that the fastener is effectively locked against separation by lateral stresses or outward pulls on the carrying mediums except a pull adjacent to the side where there is little or no neck. When the carrying medium is pulled adjacent the latter, the stud yields relatively easily at that side, because of the enlargement of the slot, and the socket may therefore be readily tipped off of the stud. Thus, I have provided a fastener which may be separated relatively easily, when pulled at a predetermined side, but cannot be separated by a pull at any other side because of the shoulder 3 combined with the stiffness of the stud adjacent the shoulder. It cannot be separated by lateral strain because of the contact of the head and neck with the socket.

I do not wish to be limited to the embodiment of my invention illustrated and described.

Claims:

1. A separable fastener stud comprising a base, a neck and a head, said head being offset relative to said neck to provide a shoulder between said head and neck, said shoulder being greater at one side than at the other sides, and a slot in said stud dividing said head and neck into contractible and expansible portions, said slot terminating in said base and one end of said slot being substantially enlarged in comparison with the other end to provide greater resiliency in said base adjacent thereto as compared with the resiliency of the base adjacent the other end of said slot.

2. A separable fastener stud comprising a base, a neck and a head, said head being offset relative to said neck to provide a shoulder between said head and neck, said shoulder being greater at one side than at the other sides, and a slot in said stud dividing said head and neck into contractible and expansible portions, said slot having its ends terminating in said base, one end only of said slot being enlarged to provide greater resiliency at that side of the stud opposite the side at which the shoulder is greatest.

3. A three side lock fastener comprising, in combination, a stud member having a base and a shank, said shank being divided by a slit to provide for contraction and expansion thereof and having a resilient offset head to provide for three-side locking engagement with a socket and a neck below said head adjacent to said base, a cooperating socket having a stud-receiving aperture surrounded by a generally curved wall which engages a portion of the neck diametrically opposite that side of the stud where the offset portion of the head is located while being spaced from the neck beneath the offset portion of the head and a vertical uninterrupted wall extending from said neck-engaging wall and cooperating with the offset portion of the head to prevent tipping separation of the fastener by stress exerted upon the fastener parts except at a predetermined side thereof.

In testimony whereof, I have signed my name to this specification.

FRED S. CARR.